Sept. 8, 1970 V. RAWLS 3,526,930
TIRE FORMING APPARATUS
Filed March 18, 1968 3 Sheets-Sheet 1

Inventor
Vaughn Rawls

Sept. 8, 1970           V. RAWLS           3,526,930
TIRE FORMING APPARATUS
Filed March 18, 1968           3 Sheets-Sheet 3
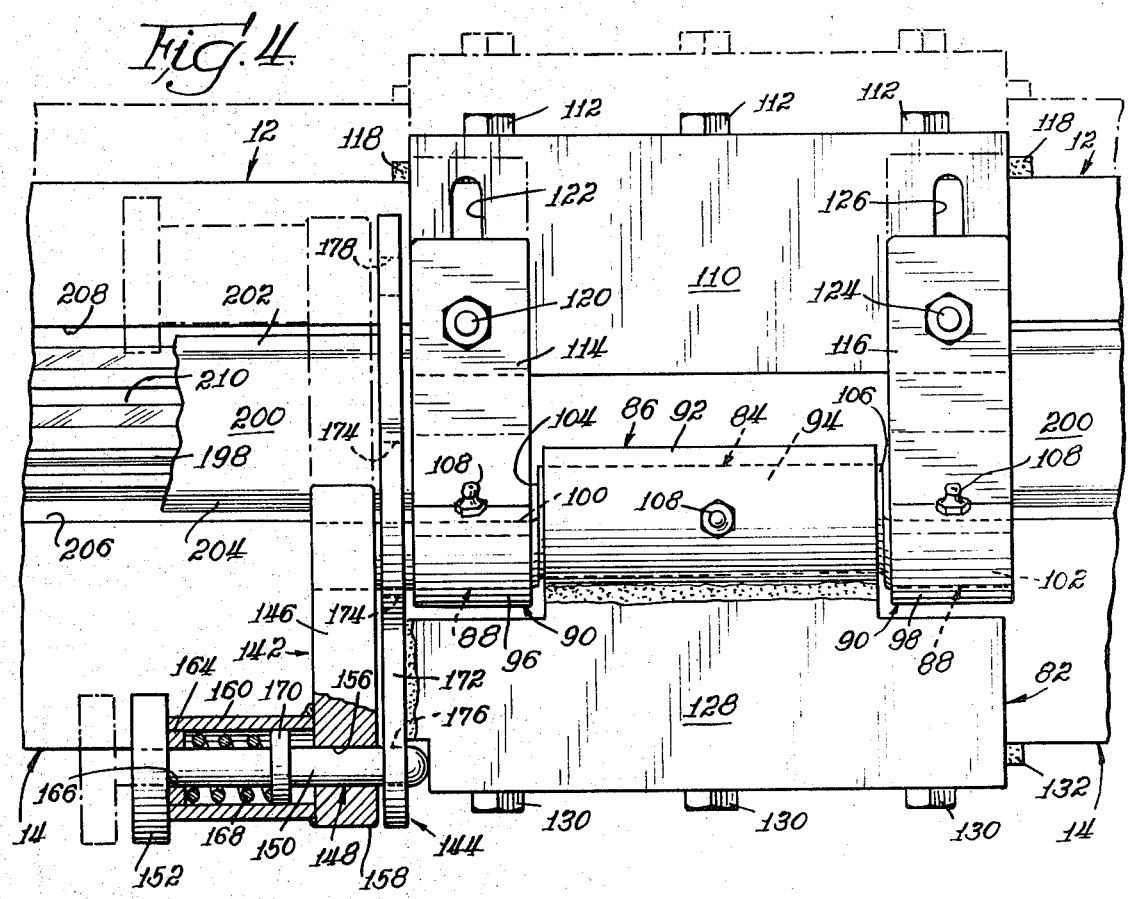
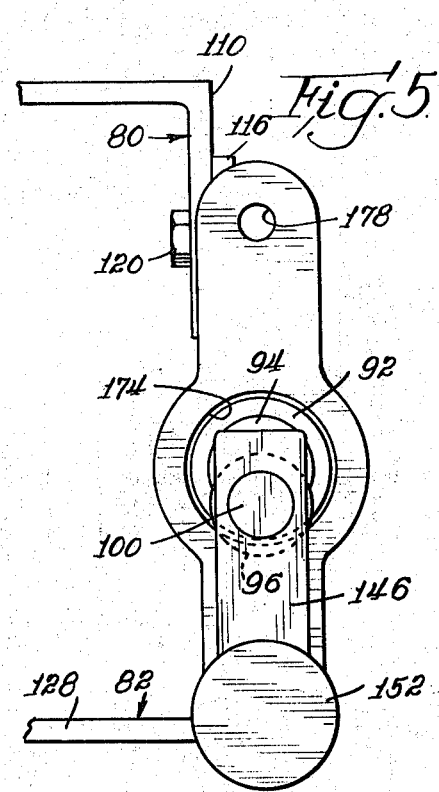
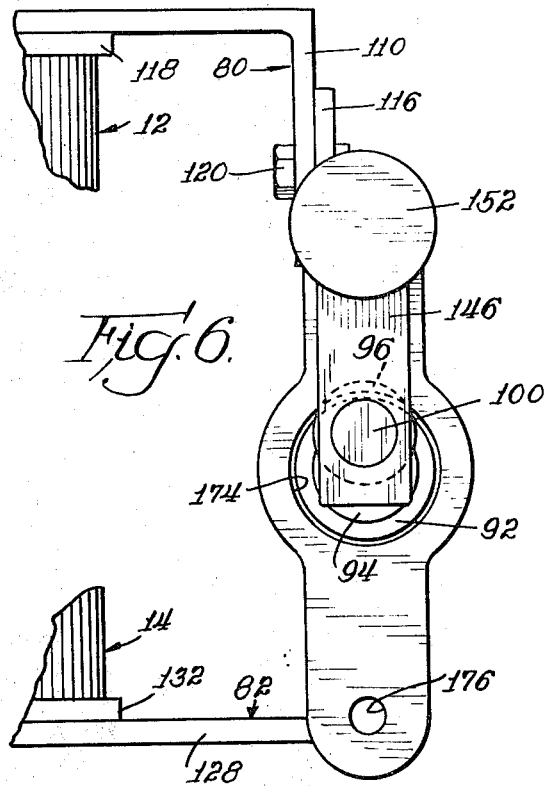

United States Patent Office 3,526,930
Patented Sept. 8, 1970

3,526,930
TIRE FORMING APPARATUS
Vaughn Rawls, Lima, Ohio, assignor to National Standard Company, Niles, Mich., a corporation of Delaware
Filed Mar. 18, 1968, Ser. No. 713,942
Int. Cl. B29h 5/02
U.S. Cl. 18—18          12 Claims

ABSTRACT OF THE DISCLOSURE

Two tire mold components without a spacer therebetween may be relatively pivoted about a first hinge axis and thereby separated to permit a tire to be inserted or withdrawn. The same tire mold components with a spacer therebetween may be relatively pivoted about a second hinge axis to the same end. The same detachable clamping band may be used to clamp together the tire mold components either with or without a spacer therebetween.

BACKGROUND OF THE INVENTION

In a commonly used method for retreading old tires, a method also useful for forming treads on new tires, a tire carcass to which uncured tread rubber has been suitable attached is inserted between two separable tire mold components. An inflatable bag is inserted within the tire carcass and inflated at high pressure to force the tread rubber outwardly into the tread-forming matrix defined by the tire mold components. Thereupon, the tire carcass and tread rubber are cured at a proper temperature for a predetermined time to form the finished tire.

The tire mold components are usually made of steel. Because of their size and weight, it is common to hinge them together and to use an overhead hoist or similar power unit to pivot one relative to the other. In this manner, the tire mold components may be separated to permit a tire to be inserted or withdrawn. In order that the tire mold components will not separate while a tire is being formed and cured, it is desirable to employ a detachable clamping band to clamp them together.

The tire mold components usually are quite expensive. For this reason, tire retreaders and other operators prefer to have a single set of tire mold components that are designed for treads of one width and to use a matching insert or spacer to adapt the same tire mold components for wider treads. Two basic tread widths are in common use, a "standard" tread width and an "oversize" tread width. With a suitable spacer, a single set of tire mold components may be used in forming tire treads with a tread pattern of either basic width.

The provision of a spacer complicates the use of hinge means for hinging together the tire mold components. Conventionally, in order that the tire mold components may be used either with or without a particular spacer, one leaf of the hinge means is bolted or otherwise rigidly attached to one of the tire mold components in a fixed arrangement, and the other leaf of the hinge means is bolted to the other tire mold component in an adjustable arrangement. Typically, a bracket is rigidly attached to the latter tire mold component and detachable bolts are used to fasten the latter leaf to the bracket in either of two positions. Such a bracket has elongated slots or the like receiving the bolts. With the latter leaf fastened in one position, the tire mold components are used without the spacer, and, with the same hinge leaf portion fastened in the other position, the tire mold components are used with the spacer.

Hinge means of the foregoing type are clumsy. Adjustments are laborious and time consuming, requiring in each instance the repositioning of the detachable bolts. There is a need for new and improved hinge means permitting two tire mold components to be hinged together for use either with or without a spacer and reducing the labor and time required for installing and removing the spacer. Such a new and improved hinge arrangement would be particularly useful in a small tire-forming shop where only a few sets of tire mold components are available and where installation and removal of spacers are called for frequently, perhaps on or more times daily.

SUMMARY OF THE INVENTION

It is the main object of this invention to provide improvements in tire forming apparatus of the type having two separable tire mold components, as discussed hereinbefore.

It is a more particular object of this invention to provide new and improved hinge means for hinging together two tire mold components so as to permit the hinged tire mold components to be used either with or without a spacer.

It is another more particular object of this invention to provide hinge means, as described, eliminating much of the labor and time ordinarily required in installing and removing the spacer.

It is another object of this invention to provide eccentric hinge means for the above purpose.

It is another object of this invention to provide hinge means, as described, for hinging together the tire mold components such that they may be relatively separated without a spacer therebetween by relative pivoting of the tire mold components about a first hinge axis, and with a spacer therebetween by relative pivoting of the tire mold components about a second hinge axis parallel to the first hinge axis.

It is another object of this invention to provide in combination with hinge means, as described, a detachable clamping band provided with two marginal flanges and adapted to clamp together the tire mold components, one of which tire mold components has a peripheral groove adapted to receive one of the marginal flanges, wherein the other of which tire mold components has a first peripheral groove adapted to receive the other of the marginal flanges when no spacer is interposed between the tire mold components and a second peripheral groove adapted to receive the same marginal flange when a spacer is interposed between the tire mold components.

Briefly described, tire forming apparatus embodying the principles of this invention comprises two separable tire mold components adapted to receive a tire carcass with a tread portion of a given width, and a spacer adapted to fit between the tire mold components to adapt them to receive a tire carcass with a wider tread portion. The tire forming apparatus further comprises hinge means between the tire mold components for defining a first hinge axis of pivotal movement of the tire mold components to opened and closed positions with respect to each other without the spacer therebetween and a second hinge axis of pivotal movement of the tire mold components to opened and closed positions with the spacer therebetween. Accordingly, the tire mold components may be separated and drawn together, without the spacer therebetween by relative pivoting of the tire mold components about the first hinge axis, and with the spacer therebetween by relative pivoting of the tire mold components about the second hinge axis which is parallel to the first hinge axis.

In addition, the tire forming apparatus may comprise a detachable clamping band provided with two marginal flanges and adapted to clamp together the tire mold components. To accommodate the clamping bands, one of the tire mold components may have a peripheral groove adapted to receive one of the marginal flanges, the other tire mold component then having a first peripheral groove adapted to receive the other of the marginal flanges when the spacer is not interposed between the tire mold components and a second peripheral groove adapted to receive the same marginal flange when the spacer is interposed between the tire mold components.

The hinge means is adjustable to a first condition for relative pivoting of the tire mold components about the first hinge axis and to a second condition for relative pivoting of the tire mold components about the second hinge axis. Furthermore, the hinge means is releaseably lockable in either condition.

These and other objects, features, and advantages of this invention may be understood from the following description, with the aid of the annexed drawings, of the presently preferred embodiment of this invention.

BRIEF DESCRIPTION OF THE DRAWINGS

In the drawings:

FIG. 4 is a fragmentary elevational view, taken along line 4—4 of FIG. 2, looking in the direction of the arrows; and FIGS. 5 and 6 are respective end views of hinge means for hinging together the upper and lower tire mold halves or components of the tire forming apparatus, FIG. 5 corresponding to FIG. 2 wherein the tire mold halves or components are hinged together without a spacer interposed therebetween, FIG. 6 corresponding to FIG. 3 wherein the tire mold halves or components are hinged together with a spacer interposed therebetween.

DESCRIPTION OF THE PREFERRED EMBODIMENT

Figure 1:
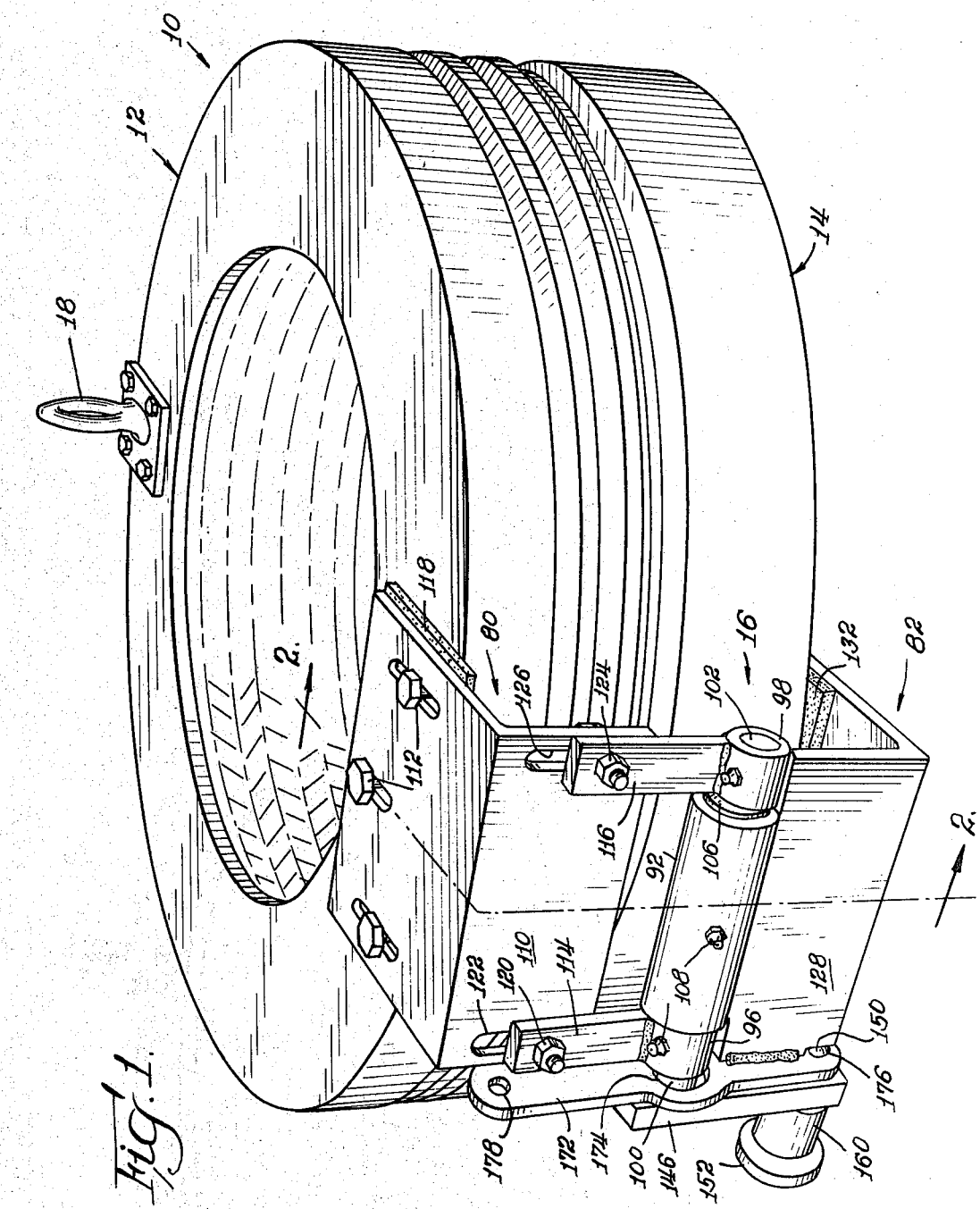
FIG. 1 is a perspective view of tire forming apparatus embodying the principles of this invention.

In FIG. 1, there is illustrated tire forming apparatus 10 which constitutes the presently preferred embodiment of this invention. The tire forming apparatus 10 comprises an upper tire mold half or component 12, a lower tire mold half or component 14, and hinge means 16 for hinging together the tire mold halves 12 and 14. The lower tire mold halve 14 is supported in a horizontal position on a rigid base (not shown). The upper tire mold half 12 has an eye member 18 bolted thereto diametrically opposite the hinge means 16. The eye member 18 is adapted to receive a hook from a conventional overhead hoist (not shown) or the like.

Figure 2:
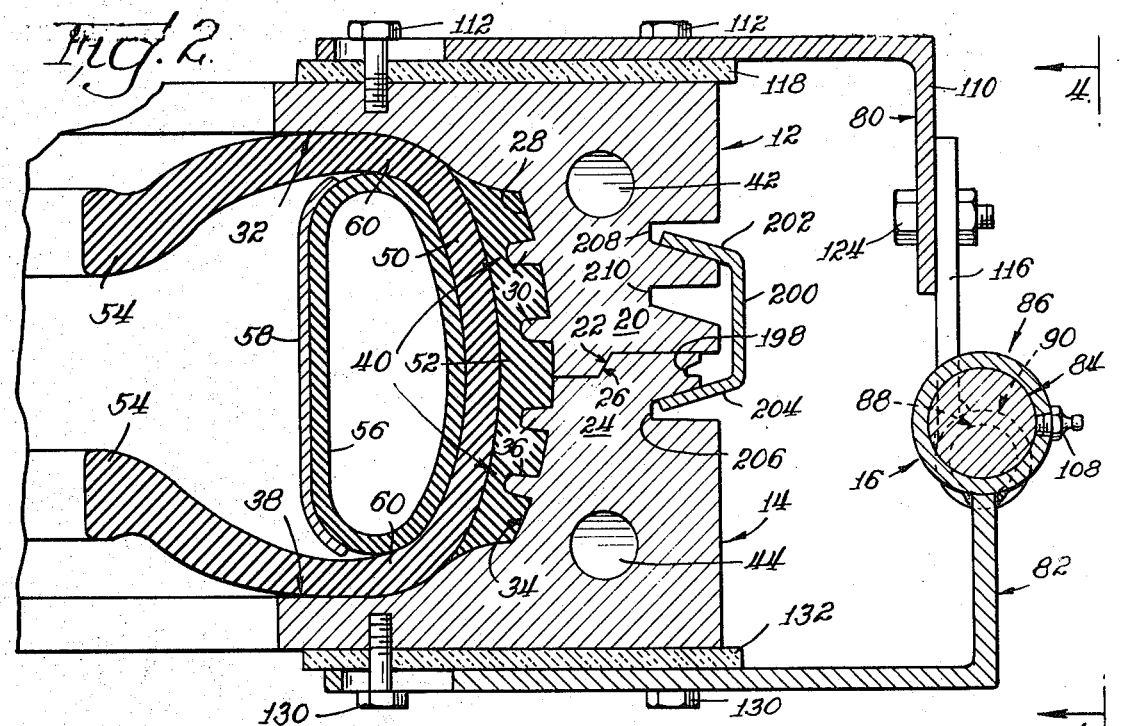
FIG. 2 is a sectional view of the tire forming apparatus of FIG. 1, taken substantially along line 2—2 of FIG. 1, looking in the direction of the arrows.

As may be understood from FIGS. 1 and 2, the tire mold halves 12 and 14 may be closed together and abutted in mating relationship to define a complete tire mold or mold cavity. The abutting portion 20 of the upper tire mold half 12 is formed with a lateral offset 22, and the abutting portion 24 of the lower tire mold half 14 is formed with a mating lateral offset 26. The upper tire mold half 12 includes a matrix portion 28, from which project integral tread-forming elements 30, and a radially inwardly extending outer skirt portion 32. The matrix portion 28 defines one-half of a tread-forming matrix for tire tread of "standard" width. The lower tire mold half 14 includes a similar matrix portion 34, from which project similar integral tread-forming elements 36, and a similar radially inwardly extending skirt portion 38. The matrix portion 34 similarly defines one half of a tread-forming matrix for tire tread of "standard" width. Together, the tire mold halves 12 and 14 provide a tire-receiving matrix cavity 40, into which project the tread-forming elements 30 and 34. As is described in detail hereinafter, provision is made for clamping together the tire mold halves 12 and 14 around a tire carcass with a tread portion of "standard" width. In order that the tire forming apparatus 10 may be heated during the curing process, the upper tire mold half 12 is provided with internal conduit means 40, within which steam may be circulated in conventional manner, and the lower tire mold half 14 is provided with similar internal conduit means 44. Conventional means are provided for circulating steam through the conduit means 42 and 44. Details of such means may be supplied readily by those skilled in the art.

FIG. 1 shows a tire carcass 50, to which uncured tread rubber or camelback has been attached to form a tread portion 52 of "standard" width. In order that the tire carcass 50 may be received within the tire mold halves 12 and 14, as shown, the upper tire mold half 12 is pivoted up and away from the lower tire mold half 14. Conventional means (not shown) are used to either spread apart or draw together the beads 54 of the tire carcass 50 thereby to reduce the outer diameter of the tread portion 52. Details of such means may be supplied readily by those skilled in the art. The tire carcass 50 is placed upon or adjacent to the skirt portion 38 of the lower tire mold half 14, whereupon the upper tire mold half 12 is lowered and clamped to the lower tire mold half 14, and the beads 54 are released. Thereupon, an inflatable bag 56, which is backed by a suitably shaped stiff curing rim 58, is inflated within the tire carcass 50 to force the uncured tread rubber or camelback of the tread portion 52 upon the tread-forming elements 30 and 36 of the tread-forming matrix. Then steam may be circulated through the conduit means 42 and 44 to heat the uncured tread rubber or camelback of the tread portion 52 to the proper curing temperature. This temperature should be maintained for a predetermined time to form the finished tire. During the curing process, the curing rim 58 serves to confine the inflated bag 56 so as to force portions of the sidewalls 60 of the tire carcass 50 tightly against the skirt portions 32 and 38 thereby to contain the heated uncured tread rubber or camelback of the tread portion 52 within the tread-forming matrix.

As may be understood with the aid of FIG. 3, because of the construction of the hinge means 16, which is described in detail hereinafter, a spacer 70 may be interposed between the tire mold halves 12 and 14. The spacer 70 has a lower lateral offset 72, which mates with the lateral offset 26 on the lower tire mold half 14, and an upper lateral offset 74, which mates with the lateral offset 22 on the upper tire mold half 20. The spacer 70 includes a matrix portion 76, from which project integral tread-forming elements 78 similar to the earlier-described tread-forming elements 30 and 36. The matrix portion 76 and the matrix portions 28 and 34 together define a tread-forming matrix for tire-tread of "oversize" width.

Figure 3:
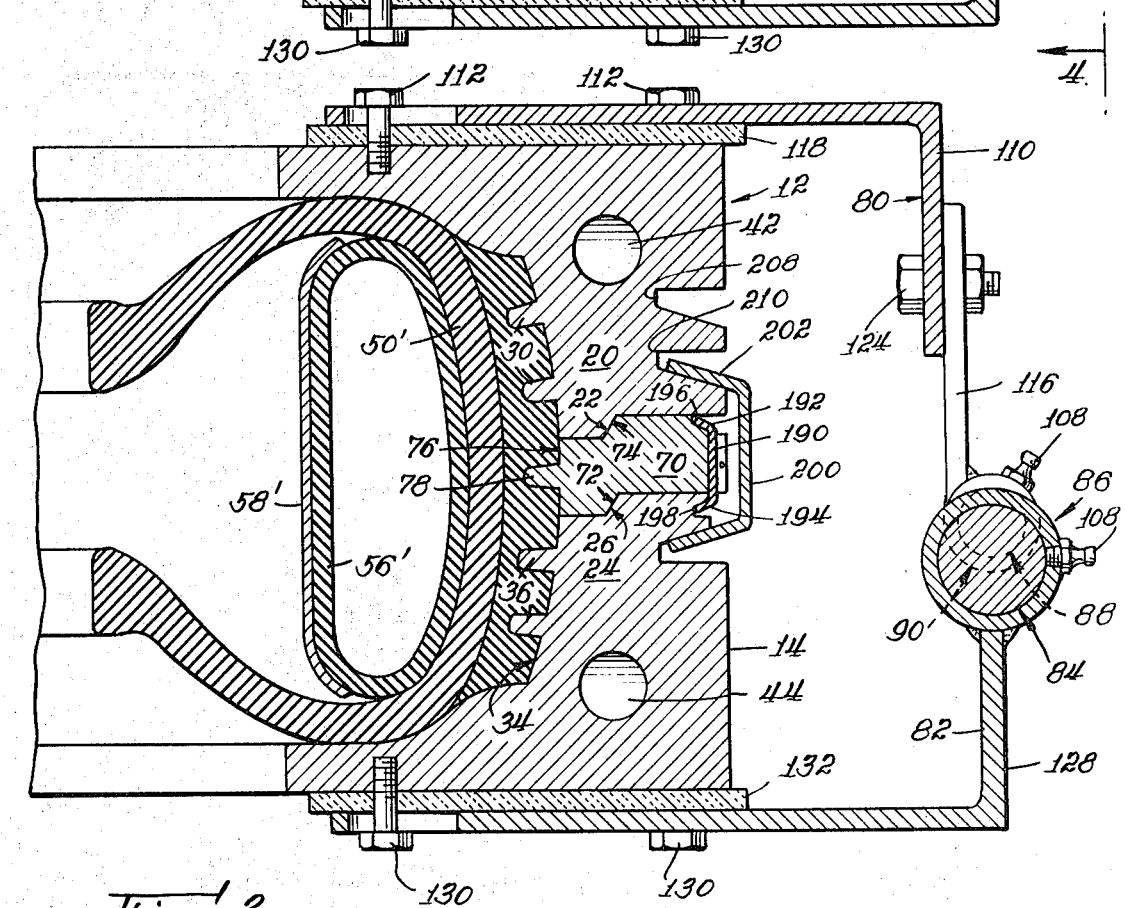
FIG. 3 is a sectional view similar to FIG. 2, with a spacer interposed between the upper and lower tire mold halves or components of the tire forming apparatus.

FIG. 3 shows a tire carcass 50', to which uncured tread rubber or camelback has been attached to form a tread portion 52' of "overside" width. The tire carcass 50' has been placed within the tire mold halves 12 and 14 in the earlier-described manner. "Oversize" inflatable bag 56', which is backed by a suitably shaped stiff curing rim 58' has been inflated within the tire carcass 50' to force the uncured tread rubber or camelback of the tread portion 52' upon the tread-forming elements 30, 36, and 78 of the tread-forming matrix. The tread portion 52' may be cured in the earlier-described manner to form the finished tire.

The hinge means 16 hinges together the tire mold halves 12 and 14 such that they may be separated and drawn together without the spacer 70 therebetween by relative pivoting of the tire mold halves 12 and 14 about a first hinge axis and with the spacer 70 therebetween by relative pivoting of the tire mold halves 12 and 14 about a second hinge axis parallel to the first hinge axis.

Referring primarily to FIG. 4, and as well to the other views, it may be seen that the hinge means 16 comprises upper hinge leaf means 80 rigidly connected to the upper tire mold half 12, and lower hinge leaf means 82 rigidly connected to the lower tire mold half 14. It further comprises the combination of first pin means 84 and first sleeve means 86, and the combination of second pin means 88 and second sleeve means 90.

The first sleeve means 86 comprises a single sleeve member 92, which is welded or otherwise rigidly connected to the lower hinge leaf means 82, and the first pin means 84 comprises a single pin 94, which is rotatably within the sleeve member 92. The second sleeve means 90 comprises two coaxial sleeve members, respectively 96 and 98, which are welded or otherwise rigidly connected to the upper hinge leaf means 80, and the second pin means 88 comprises two coaxial pins, respectively 100 and 102, which are respectively eccentrically welded or otherwise rigidly connected to the opposite ends 104 and 106 of the pin 94, and which are respectively rotatably mounted within the sleeve members 96 and 98. Provision is made for lubricating the hinge means 16 through plugs 108 on the sleeve member 92 and on the sleeve members 96 and 98.

The axis of rotation of the pin 94 within the sleeve member 92 may be designated as the first axis of rotation. The axis of rotation of the pins 100 and 102 within the sleeve members 96 and 98 may be designated as the second axis of rotation.

The upper hinge leaf means 80 comprises a right-angled bracket member 110, which is bolted to the upper tire mold half 12 by means of a plurality of bolts 112, and a pair of strap members, respectively 114, and 116, which are welded or otherwise rigidly connected to the respective sleeve members 96 and 98. A heat-insulative pad 118 may be positioned between the bracket member 110 and the upper tire mold half 12 and held in place by the bolts 112. The strap member 114 is bolted to the bracket member 110 by means of a bolt 120 passing through an elongated slot 122 in the bracket member 110, and the strap member 116 is bolted to the bracket member 110 by means of a bolt 124 similarly passing through an elongated slot 126 in the bracket member 110. The elongated slots 122 and 126 permit the hinge means 116 to be used with spacers differing somewhat in thickness from the spacer 70. However, in use, the bolted connections at the strap members 114 and 116 are rigid. The lower hinge leaf means 82 comprises a right-angled bracket member 128, which is bolted to the lower tire mold half 14 by means of a plurality of bolts 130 and is welded or otherwise rigidly connected to the sleeve member 92. A heat-insulative pad 132 may be positioned between the bracket member 128 in the lower tire mold half 14 and held in place by the bolts 130.

The hinge means 16 further comprises rotating means 142 for rotating the first pin means 84 about the first axis of rotation between a first rotated position (FIG. 5), whereat the second axis of rotation defines the earlier-mentioned first hinge axis and a second rotated position (FIG. 6) whereat the second axis of rotation defines the earlier-mentioned second hinge axis, and releasable locking means 144 for releasably locking the first pin means 84 in either rotated position. Thus, the hinge means 16 is adjustable to a first condition for relative pivoting of the tire mold halves 12 and 14 about the first hinge axis and to a second condition for relative pivoting of the tire mold halves 12 and 14 about the second hinge axis. In either condition of the hinge means 16, sleeve members 96 and 98 actually pivot upon the pins 100 and 102. Upon adjustment of the hinge means 16, the pin 94 is rotated within the sleeve member 92 so as to move the pins 100 and 102 together with the sleeve members 96 and 98. The hinge means 16 is releasably lockable in either condition. In FIG. 4, full lines indicate the position of the tire mold halves 12 and 14 when the hinge means 16 is in its first condition, and phantom lines indicate the position thereof when the hinge means 16 is in its second condition.

The rotating means 142 comprises a manual crank arm 146, which is arranged to crank the first pin means 84. More particularly, the crank arm 146 is rigidly connected in transverse relationship to the pin 100 of the second pin means 88, which in turn is eccentrically connected to the pin 94, as described.

The releasable locking means 144 comprises a crank handle 148, which is rotatably connected to the crank arm 146 and arranged for limited movement in parallel relation to the pin 100 of the second pin means 88 between a locking position and an unlocking position. In FIG. 4, the crank handle 148 is shown in full lines in its locking position and in phantom lines in its unlocking position. The crank handle 148 has an elongated cylindrical body portion 150 with an enlarged head portion 152 at one end 154 thereof. The crank arm 146 is formed with a cylindrical bore 156 near the extended end 158 thereof. A cylindrical sleeve 160 is welded or otherwise rigidly connected to the crank arm 146. The outer end 162 of the sleeve 160 is closed by an integral end portion 164, which is formed with a cylindrical bore 166 coaxial with the bore 156. The cylindrical body portion 150 slidably passes through the bores 156 and 166 such that the head portion 152 rests against the outer end 162 of the sleeve 160 when the crank handle 148 is in its locking position. The crank handle 148 is biased towards its locking position by the coiled compression spring 168, which is piloted over the cylindrical body portion 150 between the end plate 164 and a cylindrical boss 170 formed on the cylindrical body portion 150 at an intermediate point thereon. The cylindrical boss 170 is slidably confined by the sleeve 160. By the foregoing arrangement, the crank handle 148 may be moved manually to its unlocking position.

The releasable locking means 144 further comprises a locking plate 172, which is welded or otherwise rigidly connected to the sleeve member 92 in parallel relation to the crank arm 146. Locking plate 172 has an enlarged open center portion 174, through which the pin 100 may be eccentrically turned together with the pin 94; see FIGS. 5 and 6, as well as FIG. 4. The locking plate 172 is provided with a first opening 176, which receives the body portion 150 when the crank handle 148 is in its locking position and the second pin means 84 is in its first rotated position (FIG. 5), and a second opening 178, which receives the body portion 150 when the crank handle 148 is in its locking position and the second pin means 84 is in its second rotated position (FIG. 6). When the crank handle 148 is in its unlocking position, the body portion 150 clears the locking plate 172, permitting the crank arm 146 to be rotated conjointly with the first pin means 84.

As may be seen in FIG. 3, a small detachable clamping band 190 is used to clamp the spacer 72 to the lower tire mold half 14. The clamping band 190 is provided with two marginal flanges 192 and 194. The upper outer edge 196 of the spacer 70 is beveled to reecive the marginal flange 192. The lower tire mold half 14 has a peripheral groove 198 adapted to receive the marginal flange 194. Conventional means, for example a trunk latch (not shown), may be used to attach and detach the band 190.

As may be seen in FIGS. 2 and 3, a detachable clamping band 200 is used to clamp the upper tire mold half 12 to the lower tire mold half 14. The clamping band 200 is provided with two marginal flanges 202 and 204. The lower tire mold half 14 has a peripheral groove 206 adapted to receive the marginal flange 202. The upper tire mold half 12 has an upper peripheral groove 208 adapted to receive the marginal flange 204 when the spacer 70 is not interposed between the tire mold halves 12 and 14, and a lower peripheral groove 210 adapted to receive the marginal flange 204 when the spacer 70 is interposed between the tire mold halves 12 and 14; compare FIGS. 2 and 3. Conventional means, for example a trunk latch (not shown), may be used to attach and detach the band 200.

Although this invention has been described with a certain degree of particularity, it should be understood that the present disclosure has been made only by way of example and that numerous changes in the details of construction and in the combination and arrangement of parts may be resorted to without departing from the spirit and scope of this invention hereinafter claimed.

What is claimed is:

1. In tire forming apparatus, the combination of two separable tire mold components adapted to receive a tire carcass with a tread portion of a given width, a spacer adapted to fit between said tire mold components to adapt said tire mold components to receive a tire carcass with a wider tread portion, and hinge means between said tire mold components for defining a first hinge axis of pivotal movement of said tire mold components to opened and closed positions with respect to each other without said spacer therebetween and a second hinge axis of pivotal movement of said tire mold components to opened and closed positions with respect to each other with said spacer therebetween.

2. The combination of claim 1 further comprising a detachable clamping band provided with two integral marginal flanges and adapted to clamp together said tire mold components, one of said tire mold components having a peripheral groove adapted to receive one of said marginal flanges, the other of said tire mold components having a first peripheral groove adapted to receive the other of said marginal flanges when said spacer is not interposed between said tire mold components and a second peripheral groove adapted to receive said other marginal flange when said spacer is interposed between said tire mold components.

3. The combination of claim 1 further comprising means for adjusting said hinge means to define said first hinge axis for relative pivotal movement of said tire mold components about said first hinge axis and to define said second hinge axis for relative pivotal movement of said tire mold components about said second hinge axis, and releasable locking means for releasably locking said hinge means after said hinge means has been adjusted to define either said first hinge axis or said second hinge axis.

4. The combination of claim 1 wherein said hinge means comprises one hinge leaf means rigidly connected to each tire mold component, first sleeve means rigidly connected to one of said hinge leaf means, first pin means rotatable within said first sleeve means upon a first axis of rotation, second sleeve means rigidly connected to the other of said hinge leaf means, and second pin means rotatable within said second sleeve means upon a second axis of rotation parallel to said first axis of rotation and eccentrically rigidly connected to said first pin means.

5. The combination of claim 4 wherein said first sleeve means comprises a single sleeve member rigidly connected to said one hinge leaf means and said first pin means comprises a single pin rotatably mounted within said sleeve member, and wherein said second sleeve means comprises two coaxial sleeve members rigidly connected to said other hinge leaf means and respectively disposed in axially spaced relation to the opposite ends of said single sleeve member and said second pin means comprises two coaxial pins respectively eccentrically rigidly connected to said single pin at the opposite ends of said single pin and rotatably mounted within said coaxial sleeve members.

6. The combination of claim 4 wherein said hinge means further comprises rotating means for rotating said first pin means upon said first axis of rotation between a first rotated position whereat said second axis of rotation defines said first hinge axis and a second rotated position whereat said second axis of rotation defines said second hinge axis.

7. The combination of claim 6 wherein said rotating means comprises a manual crank arm arranged to crank said first pin means.

8. The combination of claim 6 wherein said hinge means further comprises releasable locking means for releasably locking said first pin means in either of said rotated positions.

9. The combination of claim 8 wherein said rotating means comprises a manual crank arm arranged to crank said first pin means.

10. The combination of claim 9 wherein said releasable locking means comprises a crank handle rotatably connected to said crank arm and arranged for limited movement in parallel relation to said first pin means between a locking position and an unlocking position, and a locking plate fixed with respect to said first sleeve means in parallel relation to said crank arm and provided with a first opening receiving said crank handle when said crank handle is in said locking position and said second pin means in said first rotated position and with a second opening receiving said crank handle when said crank handle is in said locking position and said second pin means is in said second position, said crank handle being biased to said locking position and being manually movable to said unlocking position to permit said crank arm to be rotated conjointly with said first pin means.

11. The combination of claim 10 wherein said first sleeve means comprises a single sleeve member rigidly connected to said one hinge leaf means and said first pin means comprises a single pin rotatably mounted within said single sleeve member, and wherein said second sleeve means comprises two coaxial sleeve members rigidly connected to said other hinge leaf means and respectively disposed in axially spaced relation to the opposite ends of said single sleeve member and said second pin means comprises two coaxial pins respectively eccentrically rigidly connected to said single pin at the opposite ends of said single pin and rotatably mounted within said coaxial sleeve members.

12. The combination of claim 11 wherein said crank arm is rigidly connected in transverse relationship to one of said coaxial pins.

References Cited

UNITED STATES PATENTS

| 2,372,216 | 3/1945 | MacMillan. |
| 2,372,217 | 3/1945 | MacMillan. |
| 3,091,802 | 6/1963 | Rawls. |
| 3,161,911 | 12/1964 | Mathews. |

J. HOWARD FLINT, Jr., Primary Examiner

U.S. Cl. X.R.

18—2, 17